ERROR DETECTION CIRCUITS

Filed Aug. 5, 1964 4 Sheets-Sheet 1

INVENTORS D. W. HUFFMAN
W. N. TOY
BY Lucian C. Canepa
ATTORNEY

ERROR DETECTION CIRCUITS

Filed Aug. 5, 1964 4 Sheets-Sheet 2

April 30, 1968 D. W. HUFFMAN ET AL 3,381,270

ERROR DETECTION CIRCUITS

Filed Aug. 5, 1964 4 Sheets-Sheet 3

United States Patent Office 3,381,270

Patented Apr. 30, 1968

3,381,270

ERROR DETECTION CIRCUITS

Donald W. Huffman, Shrewsbury, and Wing N. Toy, Colts Neck, N.J., assignors to Bell Telephone Laboratories, Incorporated, New York, N.Y., a corporation of New York Filed Aug. 5, 1964, Ser. No. 387,645
12 Claims. (Cl. 340—146.1)

ABSTRACT OF THE DISCLOSURE

Error control circuitry has been incorporated into a binary to one-out-of-N translating matrix in order to detect faults which produce multiple outputs as well as malfunctions which produce no output at all. One embodiment of the invention comprises two detecting gates selectively connected to the matrix crosspoints. Sequentially energizing the crosspoints associated with the first gate checks the crosspoints associated with the second gate. Similarly, selective energization of the crosspoints connected to the second gate checks the crosspoints connected to the first gate.

This invention relates to signal translating arrangements and, more particularly, to a circuit for detecting the occurrence of errors in a translation system.

Systems which include a matrix arranged for translating a digital representation into an output indication in which one and only one at a time of a plurality of output conductors is energized, are well known in the information processing art. Such systems are used therein to perform a variety of functions. One typical such use is in the program translator unit of a digital computer wherein each command or instruction of a program is translated from a binary number to a one-out-of-N output indication. In turn, the output signal activates associated control circuitry that actually implements the translated command.

Under normal operating conditions typical computing systems require that only one program command be executed at a time. If, however, the program translator unit of such a system produces two simultaneous output indications, one additional extraneous command will be implemented. Such double outputs can seriously affect the overall operation of the computer and produce erroneous results therefrom that are not easily detectable.

An object of the present invention is the improvement of signal translating arrangements.

More specifically, an object of this invention is the detection in a relatively simple and reliable manner of erroneous double output signals which occur in binary to one-out-of-N translators.

These and other objects of the present invention are realized in a specific illustrative embodiment thereof that includes an error-detecting circuit having N input terminals respectively connected in a selected manner to N crosspoint units of an associated binary to one-out-of-N translating array. The array is of a type in which double outputs when they occur will most likely emanate from the crosspoint units disposed along a selected row or column.

Illustratively, the array with which the specific embodiment is associated comprises $n$ rows and $n$ columns and the error-detecting circuit includes first and second input gates. The input terminals of the first input gate are respectively connected to the output terminals of the crosspoint units which are disposed along the main diagonal of the array, and the input terminals of the second input gate are respectively connected to all the other crosspoint units of the array. Thus, for example, in a square 8 x 8 matrix array the output terminals of the eight crosspoint units disposed along the main diagonal are respectively connected to the eight input terminals of the first error-detecting input gate, and the output terminals of the remaining 56 crosspoint units are respectively connected to the 56 input terminals of the second input gate.

In accordance with the described pattern of interconnections between the crosspoint units and the first and second error-detecting input gates, there is one and only one crosspoint output terminal in any row or column of the matrix array that is connected to the first gate. Therefore, sequential energization of the diagonally-disposed crosspoint units should provide successive output signals from the first gate and no output signals from the second gate. If, however, the second gate also provides an output signal in coincidence with the energization of a particular diagonally-disposed unit, it is an indication that another crosspoint unit in the row or column which includes the particular unit has been energized. If such a double energization of crosspoint units occurs, the two resulting output signals from the first and second gates are applied to an associated error indicator to cause it to indicate a fault condition in the translation array.

In a translation array of the particular type with which an illustrative embodiment of the present invention is adapted to be associated, no single fault in the arrangement can cause more than one at a time of the diagonally-disposed crosspoint units to be energized. If the single fault affects a crosspoint unit that is not disposed along the main diagonal, sequential energization of the diagonally-disposed crosspoint units leads to detection of the fault, as described above. If, on the other hand, the single fault affects one of the diagonally-disposed crosspoint units, another selected set of crosspoint units must be sequentially energized or exercised to detect errors arising from the fault. This second selected set must comprise crosspoint units which are included in all rows and columns of the matrix array. Illustratively, this requirement is met in an 8 x 8 square matrix by selecting a set of eight crosspoint units which lie along a pair of lines which encompass and are parallel to the main diagonal.

Thus, by sequentially energizing the crosspoint units included in two selected sets of a translation array, the array is checked in a simple and reliable manner for double outputs.

It is a feature of the present invention that an error-detecting circuit which is adapted to be connected to an N-crosspoint translation array include N input terminals respectively connected in a selected manner to the crosspoints of the array.

It is another feature of such an error-detecting circuit that it include only two input gates and that one of these gates be connected to a selected set of crosspoint units which includes one and only one crosspoint unit in every row and column of the translation array, whereby sequential activation of this selected set energizes only the one gate to indicate error-free operation of the translation array and energizes both gates to indicate erroneous operation thereof.

It is still another feature of this invention that the other input gate of the error-detecting circuit be connected to every crosspoint unit of the array except those to which the first gate is connected.

It is yet another feature of the present invention that circuitry be connected to the translation array for sequentially energizing the crosspoint units which are connected to the first error-detecting gate and for sequentially energizing a distinct set of crosspoint units including a unit from every row and column of the array.

A complete understanding of the present invention and of the above and other features and advantages thereof may be gained from a consideration of the following detailed description of an illustrative embodiment thereof shown hereinbelow in connection with the accompanying drawing, in which.

Figure 1:
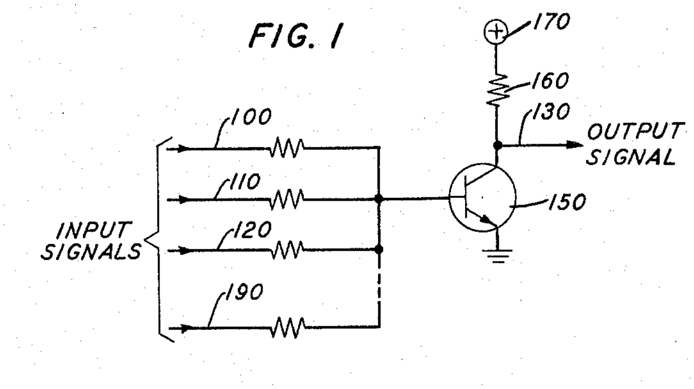
FIG. 1 is a schematic depiction of one particular type of basic logic circuit out of which an error detecting circuit made in accordance with this invention may be constructed.

Before proceeding to a detailed description of the present invention, it will be helpful to describe one illustrative type of logic circuit out of which the specific error-detecting circuit described hereinbelow may advantageously be constructed. FIG. 1 shows such a circuit. The arrangement shown in FIG. 1 is the basic circuit of the logic technology known as transistor resistor logic (TRL). A general description of TRL circuits may be obtained by referring to an article entitled "Transistor NOR Circuit Design" by W. D. Rowe and G. H. Royer in volume 76 part I, of the Transactions of the American Institute of Electrical Engineers, Communications and Electronics, July 1957, pages 263–267.

The logic circuit shown in FIG. 1 includes four leads 100, 110, 120 . . . 190 to which may be applied selected input signals to produce on a lead 130 an output signal which is a predetermined logic function of the inputs. The circuit also includes an n-p-n transistor 150, a collector load resistor 160 and a positive source 170 of direct-current power.

If a voltage near ground potential is applied to every one of the input leads 100, 110, 120 . . . 190 shown in FIG. 1, the transistor 150 is in its nonconducting state and the potential of the output lead 130 is, as a result, positive with respect to ground. On the other hand, if a positive potential is applied to any one or more of the input leads 100, 110, 120 . . . 190, the transistor 150 is energized and the output conductor 130 is then near ground potential.

Thus, for example, if a positive signal is applied to the input lead 100 and a signal near ground is applied to every other one of the input leads shown in FIG. 1, the potential of the output lead 130 is near ground. Assume, however, that due to a faulty connector or other malfunction the input lead 100 is broken, i.e., becomes open-circuited. The result of such a fault is that the depicted logic circuit does not function in its intended manner. In particular, the circuit would under the assumed circumstances provide a positive rather than a ground output signal. In practice this type of malfunction is one of the most common to occur and one of the most difficult to detect. The specific illustrative embodiment described herein is adapted to detect such occurrences.

Figure 2:
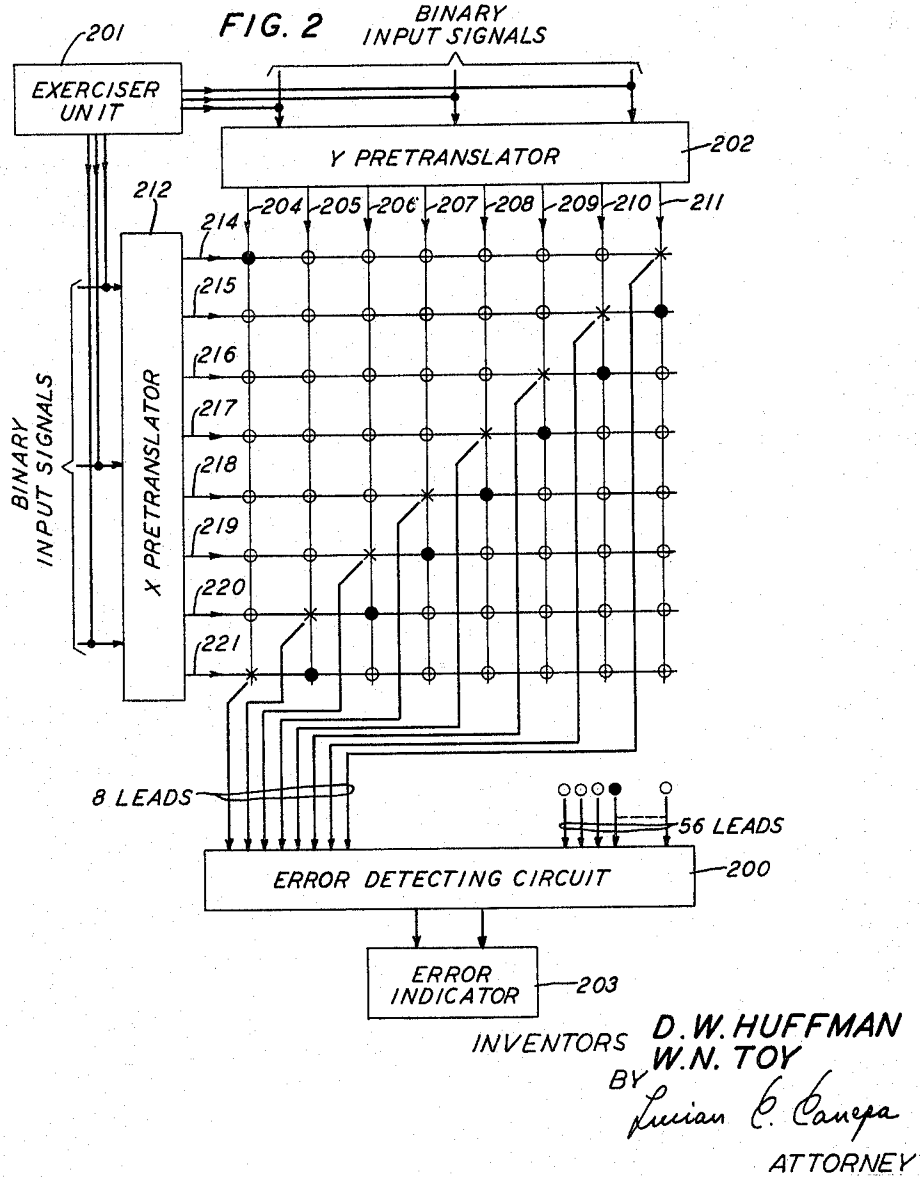
FIG. 2 is a general representation showing the overall manner in which an error-detecting circuit made in accordance with this invention is interconnected with a square translation array.

FIG. 2 shows in overall terms a translation matrix associated with an error-detecting circuit 200 which is made in accordance with the principles of the present invention. The matrix arrangement includes a conventional Y pretranslator 202 for converting a three-digit input binary representation into an energization of one and only one of eight output leads 204–211 emanating from the pretranslator, Additionally, the arrangement includes a conventional X pretranslator 212 for converting a three-digit input binary representation into an energization of one and only one of eight output leads 214–221.

Illustratively, the Y pretranslator 202 responds to the application thereto of the input signal representations 000, 001, 010, 011, 100, 101, 110 and 111 by energizing the leads 204, 205, 206, 207, 208, 209, 210, 211, respectively. Similarly, the X pretranslator 212 may be considered to activate the output leads 214, 215, 216, 217, 218, 219, 220, 221 in response to the input representations 000, 001, 010, 011, 100, 101, 110 and 111 respectively.

The two sets of leads extending from the Y and X pretranslators 202 and 212 form 64 intersections which are arranged in eight rows and eight columns of a matrix array. Connected to each of the 64 intersections of the array is a distinct two-input crosspoint unit or logic circuit of the general type shown in FIG. 1. Thus, for example, as shown in more detail in FIG. 3, the upper left-hand two-input logic circuit included in the matrix array has one of its input terminals connected to the lead 204 and its other input terminal connected to the lead 214. The other 63 logic circuits are connected in a similar manner to the output leads of the Y and X pretranslators. The 64 output leads emanating from these 64 logic circuits are considered to be the main output leads of the herein-described translation array.

Assume that the binary representation is 100 is applied as an input to each of the Y and X pretranslators 202 and 212 shown in FIG. 2. In response thereto the leads 208 and 218 are grounded. As a result, the particular logic circuit having its input terminals respectively connected to those leads is deenergized, thereby causing a positive signal to appear on the output lead connected to that particular circuit. All other nonselected crosspoint units should continue to provide ground potential output signals.

Assume further, however, that a fault ocurs in the logic circuit whose input terminals are connected to the leads 208 and 214. In particular, assume that somehow a break develops in the wire that connects the lead 214 to one input terminal of this logic circuit. In effect then this circuit is converted into a one-input crosspoint unit. Therefore, the above-assumed grounding of the lead 208 by the Y pretranslator 202 causes the output of this logic circuit to be also energized, which in turn causes the translation array to provide two rather than only one positive output signals on the main output leads thereof. This is the type of fault condition and consequent erroneous output that the present invention is adapted to detect.

In accordance with the principles of this invention the 64 output leads of the 64 crosspoint units of the 8 x 8 matrix generally represented in FIG. 2 are connected in a selected manner to two input gate units included in the error-detecting circuit 200. In particular, the output leads of the eight crosspoint units that are disposed along the main diagonal of the matrix array are respectively connected to the input terminals of a first one of these gate units. The eight crosspoint units which are disposed along the main diagonal of the array of FIG. 2 are schematically represented by eight X's at the appropriate intersections of the 16 leads emanating from the pretranslators 202 and 212. The eight respective leads which extend from these eight X's to the error-detecting circuit 200 are grouped together to indicate that they are connected to the respective input terminals of the aforementioned first one of the gate units in the circuit 200.

The output leads of the other 56 crosspoint units included in FIG. 2 are respectively connected to the input terminals of the other or second one of the input gates included in the circuit 200. These crosspoint units are represented in FIG. 2 by respective circles, eight of which are black (for a reason set forth in detail below). In the interest of not unduly cluttering the FIG. 2 depiction, the wires which actually extend from these crosspoint units to the 56 circle-designated leads indicated as entering the circuit 200, are not actually shown.

The above-described selective grouping of the output leads of the crosspoint units represented in FIG. 2 is such that if the diagonally-disposed crosspoint units are sequentially energized, all other crosspoint units included in the associated translation array are effectively tested for error-causing faults. Illustratively, such energization takes place under the control of signals applied to the pretranslators 202 and 212 from an exerciser unit 201. The unit 201 is programmed to supply eight pairs of three-digit binary numbers to the inputs of the pretranslators 202 and 212, each such pair of numbers resulting in the activation of the row and column at whose intersection is located one of the X-designated crosspoint units of FIG. 2. Thus, for example, if the exerciser unit 201 simultaneously supplies the binary representation 000 to the Y pretranslator 202 (thus selecting the lead 204) and the binary representation 111 to the X pretranslator 212 (thus selecting the lead 221) the particular crosspoint unit located at the bottom left-hand corner of the array shown in FIG. 2 is selected. As a result of the selection of this particular unit, the first one of the error-detecting gates included in the circuit 200 is activated to provide a ground output signal. If no other crosspoint unit in the first column (defined by the lead 204) or in the last row (defined by the lead 221) of the matrix array provides a positive output signal, the other error-detecting gate in the circuit 200 is not energized and the resulting dissimilar signals applied to the error indicator 203 signify that the crosspoint units in the noted column and row are free from faults of the type that cause extraneous output signals. In other words, if any crosspoint unit other than the X-designated one in the first column and last row is driven to provide a positive output signal, the error-detecting circuit 200 supplies identical error-indicating signals to the unit 203. It is noted that the unit 203 may be an array of lamps, or alarms, or an EXCLUSIVE-OR circuit, or any other suitable indicating apparatus.

As described above, sequential energization of the eight X-designated crosspoint units of the FIG. 2 matrix checks the other 56 crosspoint units for the existence of faults therein. Assume that no faults are present in these 56 other units. The eight diagonally-disposed crosspoint units can themselves then be checked for faults by sequentially energizing another set of eight units representative of all rows and columns of the depicted array. An illustrative such set is designated in FIG. 2 by eight black circles. Thus, for example, if the exerciser unit 201 supplies the binary representation 000 to each of the pretranslators 202 and 212, the crosspoint unit in the upper left-hand corner of the array is energized. If both error-detecting gates in the circuit 200 are activated as a result of this energization, there is provided to the error unit 203 an indication that one of the X-designated crosspoint units is faulty. (Remember that it was assumed above that all the circle-designated crosspoint units were checked and found to be error-free.) In particular, such an error indication would signify that either or both of the lower left-hand and upper right-hand X-designated units are faulty. In a similar manner the exerciser unit 201 is arranged to selectively energize the seven other black circle crosspoint units, thereby to check the remaining X-designated units for the existence of faults therein.

As stated above, the X-designated crosspoint units shown in FIG. 2 may be checked by a set of units that includes a unit in every row and column of the depicted matrix array. In general, this requirement is met by selecting a set of eight crosspoint units which lie along a pair of lines which encompass and are parallel to the main diagonal along which the X-designated units are disposed.

Thus, in the specific manner described above, the cycling through or exercising of two sets of crosspoint units (each set including eight units) checks all 64 units of the matrix array shown in FIG. 2 for faults of the type that give rise to multiple outputs. Moreover, as noted below in connection with the description of FIG. 3, such exercising also detects multiple outputs which stem from faults in the Y and X pretranslators 202 and 212.

Figure 3:
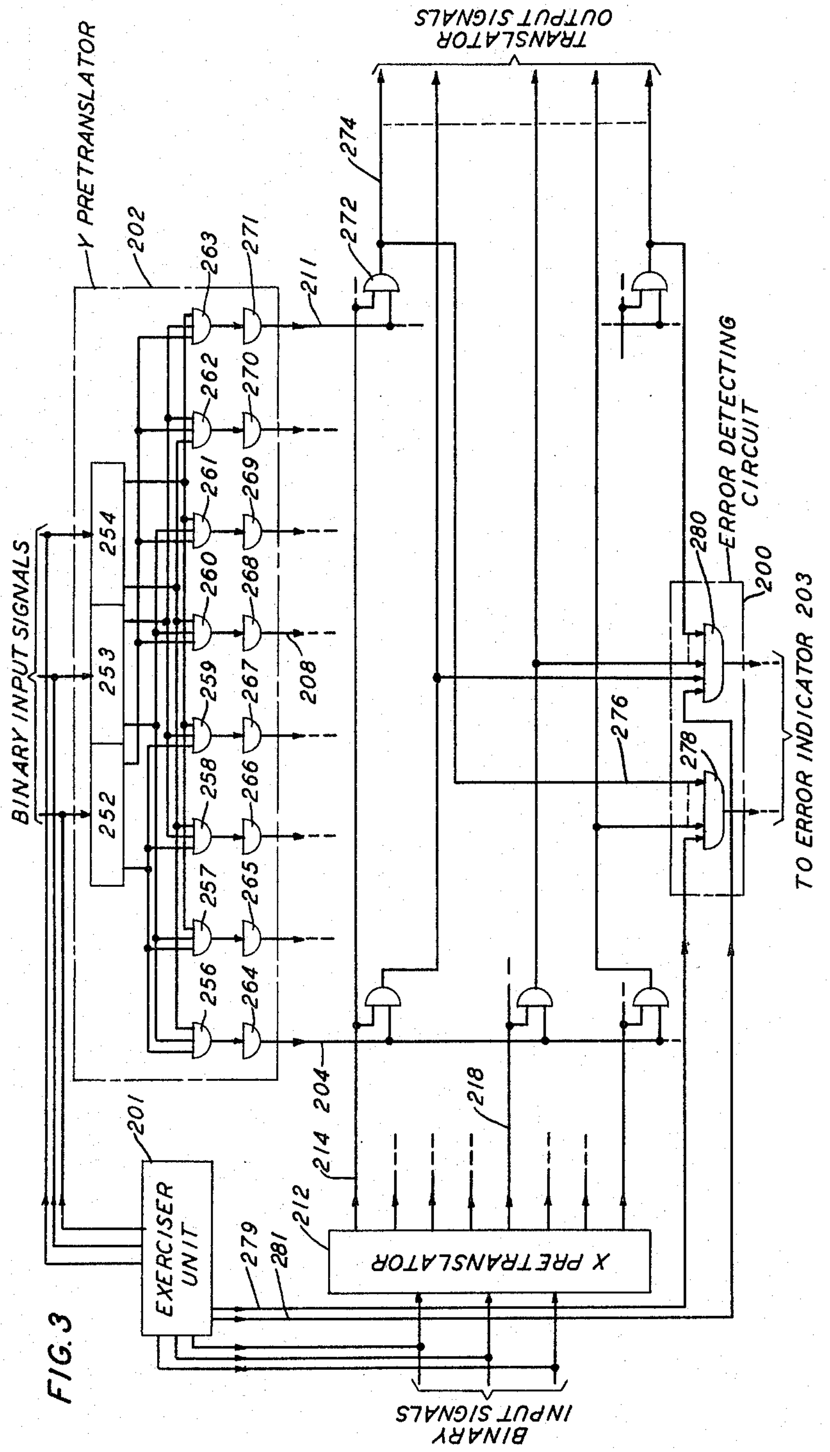
FIG. 3 shows in detail an error-detecting circuit made in accordance with the principles of the present invention and, in addition, illustrates the manner in which such a circuit is interconnected with a translation array.

FIG. 3 is a more detailed showing of the overall arrangement depicted in FIG. 2. The Y and X pretranslators 202 and 212 shown in FIG. 3 may, for example, be identical to each other and each take the form illustrated by the pretranslator 202. The unit 202 includes three flip-flops 252, 253, 254 each having two-rail outputs which are applied in the specific manner shown to eight gate circuits 256–263 whose respective outputs are applied via eight inverter circuits 264–271 to the above-mentioned matrix-forming leads 204–211. Advantageously, each of the gate and inverter circuits included in the pretranslator 202 is of the general type described above and shown in FIG. 1.

If the left-hand flip-flop 252 illustrated in FIG. 3 is in its "1" state, its right-hand lead may be considered to be near ground. Similarly, if the middle flip-flop 253 and the right-hand flip-flop 254 are also in their "1" state, their right and left-hand output leads are near ground and positive, respectively. As a result of these assumed conditions (which correspond to the application to the Y pretranslator 202 of the binary representation 111) the inverter circuit 271 provides a ground signal output on the lead 211, whereas each of the other inverter circuits 264–270 provides a positive output signal.

The ground signal assumed above to be present on the lead 211 of FIG. 3 is applied to one input terminal of a crosspoint unit 272 whose other input terminal is connected to the lead 214 emanating from the X pretranslator 212. Assume that the lead 214 is the only one of the leads from the pretranslator 212 which has a ground signal applied thereto. Consequently, the crosspoint unit 272 provides a positive signal on a main output lead 274. If the translating array shown in FIG. 3 is operating correctly, the unit 272 is the only one of the 64 crosspoint units included therein to provide such an output signal.

The output of the crosspoint unit 272 depicted in FIG. 3 is coupled via a lead 276 to one input terminal of a gate unit 278 included in the error-detecting circuit 200 which is a specific illustrative embodiment of the principles of the present invention. The circuit 200 includes one other gate unit 280 and, illustratively, each of the units 278 and 280 is of the general type shown in FIG. 1. Each of the other 63 crosspoint units included in the matrix array of FIG. 3 is connected to an input terminal of one of the gates 278 and 280, although it is noted that FIG. 3 shows only the actual interconnections between the gate units 278 and 280 and a selected illustrative few of the crosspoint units in the matrix array. The interconnections between the other crosspoint units and the two gate units 278 and 280 are made in accordance with the specific manner represented in FIG. 2.

As stated above, only one crosspoint unit normally provides a positive output signal in response to binary signals applied to the pretranslators 202 and 212, the other 63 such units each normally supplying a ground signal. Hence, only one of the gate units 278 and 280 has a positive signal applied thereto. As a result, one gate unit provides a ground output signal and the other gate unit provides a positive output signal. In turn, these two output signals are applied to the error indicator 203 which senses the nature of these signals to signify an error or an error-free condition as the case may be. In particular, if the error-detecting gate units 278 and 280 provide dissimilar output signals (one positive and the other near ground) the unit 203 responds thereto by providing an error-free indication. On the other hand, the unit 203 responds to a ground output signal from each of the gate units 278 and 280 to provide an error signal indicative of the fact that two or more of the crosspoint units in the matrix array are providing positive output signals. Additionally, if the gate units 278 and 280 both supply positive output signals, this is sensed by the unit 203 as indicative of no crosspoint unit providing a positive output signal.

A multiple output indication by the error unit 203 may arise from a broken input connection to one of the crosspoint units in a selected row or column. Also, multiple translator outputs may occur if one of the input leads to one of the three-input gate units included in the pretranslators 202 and 212 is broken. Such an occurrence causes two rather than only one of the leads emanating from a pretranslator to be at ground potential, whereby two crosspoint units in the selected row or column would be controlled to provide positive output signals. In accordance with the error-detecting principles described above, the circuit 200 would also detect erroneous outputs arising from pretranslator faults of the type described.

The exerciser unit 201 may comprise any conventional signal generating arrangement adapted to supply three-digit binary input signals to the Y and X pretranslators 202 and 212. In addition, the exerciser unit 201 is designed to periodically and selectively apply positive signals via leads 279 and 281 to the gate units 278 and 280 to test the circuit 200 for proper response to multiple input signals.

In order to check the error-detecting circuit 200, the exerciser unit 201 may, for example, apply a positive signal to the lead 279 and then sequentially activate every crosspoint unit whose respective output lead is connected to the gate 280. Correct operation is indicated by two ground signals being successively applied by the gates 278 and 280 to the error indicator 203. Similarly, the application by the exerciser unit 201 of a positive signal to the gate 280 while at the same time sequentially activating every input to the gate 278, is effective to complete the testing of the circuit 200.

Figures 4, 5:
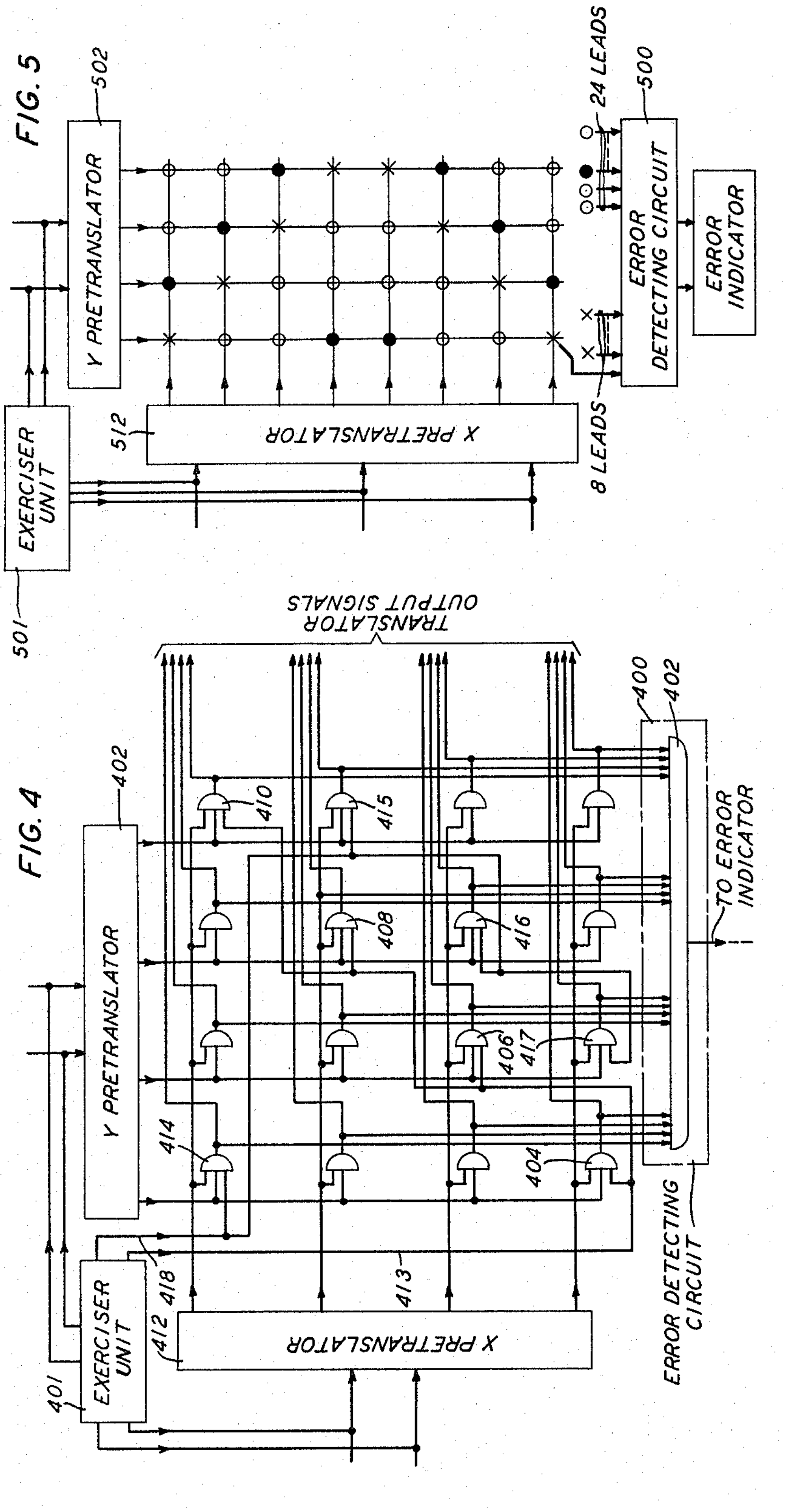
FIG. 4 depicts in detail another illustrative embodiment made in accordance with the principles of the present invention.
FIG. 5 is a general representation showing the overall manner in which an error-detecting circuit made in accordance with this invention is interconnected with a rectangular translation array.

FIG. 4 depicts an alternative embodiment of an error-detecting circuit made in accordance with the principles of the present invention. The illustrative embodiment is shown associated with a 4 x 4 square matrix array having 16 crosspoint units and 16 main output leads. The error-detecting circuit 400 included in FIG. 4 comprises only one gate unit 402 which may be of the general type shown in FIG. 1. The gate 402 includes 16 input terminals that are respectively connected to the output leads of the 16 crosspoint units in the matrix.

Four of the crosspoint units of the matrix array of FIG. 4 are disposed along the main diagonal thereof. These units are designated 404, 406, 408, 410 and each has three input leads connected thereto. Two of the input leads for each of these units are respectively connected to the intersecting row and column conductors associated therewith, the third lead 413 connected to each of these units extending to the exerciser unit 401. The purpose of the lead 413 is to apply an inhibiting signal to each of the diagonally-disposed crosspoint units 404, 406, 408, 410 during the sequential test energization of these units by the unit 401.

More specifically, if the exerciser unit 401 of FIG. 4 applies two-digit binary signals to the Y and X pretranslators 402 and 412 to energize the row and column conductors connected to a selected one of the diagonally-disposed crosspoint units, the selected crosspoint unit would ordinarily supply a positive output signal to its main output lead and to the error-detecting circuit 402. However, in approximate time coincidence with the noted application of binary signals to the pretranslators, the exerciser unit 401 also applies via the lead 413 an inhibiting or positive signal to each of the diagonally-disposed crosspoint units, thereby maintaining the output of the selected unit at ground potential. As a result, the error-detecting circuit 402 does not normally have a positive signal applied thereto during this portion of the testing procedure. But if another crosspoint unit in the selected row or column includes a fault of the type that causes the unit to provide a positive signal in response to the activation of the selected row and column conductors, then the error-detecting circuit 402 does receive a positive signal indicative of an error condition in the matrix.

Sequential activation of the diagonally-disposed crosspoint units shown in FIG. 4, with a simultaneous inhibition of the output signals therefrom, checks 12 crosspoint units not disposed along the main diagonal for the presence of error-causing faults therein. If a fault exists in one of these 12 units, the error-detecting circuit 402 provides a ground output signal in response to the selective energization of the row and column conductors which include the faulty unit.

In a manner similar to that described above in connection with FIGS. 2 and 3, the diagonally-disposed crosspoint units shown in FIG. 4 may themselves be checked for error-causing faults by selectively energizing another set of four units representative of every row and column of the matrix array. An illustrative such set includes the cross-point units designated 414–417 in FIG. 4, each of which has a third or inhibiting input signal lead 418 extending thereto from the exerciser unit 401.

To check the diagonally-disposed crosspoint units shown in FIG. 4 for the presence of faults therein, the crosspoint units 414–417 are sequentially selected by signals applied to the Y and X pretranslators 402 and 412 by the exerciser unit 401. Inhibiting signals are applied to the units 414–417 in coincidence with their selection, whereby no one of them provides a positive signal to the error-detecting circuit 402 during this checking phase. If, however, one of the diagonally-disposed crosspoint units is faulty, it will supply a positive signal to the error-detecting circuit 402 during the noted checking phase, thereby to drive the circuit 402 to supply an error-indicating ground signal to its associated error unit.

Although emphasis herein so far has been directed to an error-detecting circuit adapted to be associated with a square matrix, it is to be understood that the principles of the present invention are not limited thereto. Thus, as illustrated in FIG. 5, a rectangular matrix array may be combined with an error-detecting circuit made in accordance with this invention. The rectangular array of FIG. 5 is formed by the four output leads of a Y pretranslator 502 which converts a two-digit binary representation to a 1-out-of-4 indication and by the eight output leads of an X pretranslator 512 which converts a three-digit binary number to a 1-out-of-8 indication. The diagonally-disposed crosspoint units of the noted array are designated by X's and their respective output leads are represented as being grouped together and connected to the respective input terminals of one gate unit of an error-detecting circuit 500 which illustratively is of the type shown in FIG. 3. The 24 remaining crosspoint units of the matrix array are designated by circles and their respective output leads are represented as being grouped together and connected to the respective input terminals of the other gate unit included in the error-detecting circuit 500.

In a manner similar to that specified above in connection with the description of FIG. 3, sequential activation by the exerciser unit 501 of the X-designated crosspoint units of FIG. 4 checks the circle-designated crosspoint units for the presence of faults therein. As before, the X-designated units themselves are checked by sequentially activating another selected set of crosspoint units, specifically, a set which includes a unit from every row and column of the array. An illustrative such set is designated in FIG. 5 by black circles.

Figures 6, 6A, 6B, 6C, 6D:
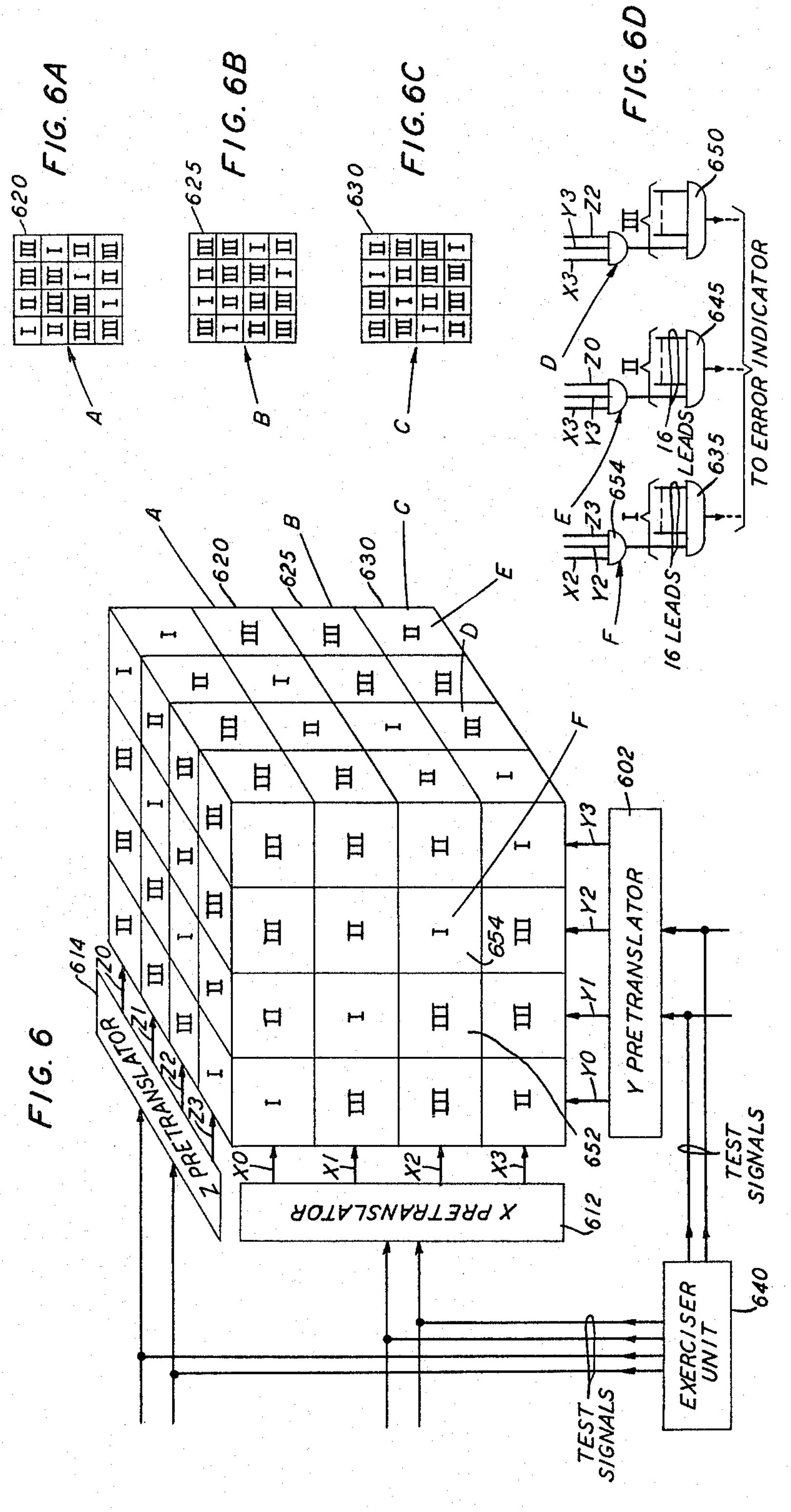
FIG. 6 (6A–6D) shows the manner in which another illustrative embodiment of the principles of the present invention is interconnected with a cubic array.

An error-detecting circuit made in accordance with the principles of the present invention may also be combined with three-dimensional translation arrays such as, for example, the cubic array schematically illustrated in FIG. 6. The overall array of FIG. 6 is depicted as being composed of 64 component cubes each of which is representative of a three-input crosspoint unit of the general type shown in FIG. 1. Connected to selected ones of the crosspoint units are three pretranslators, a Y pretranslator, 602, an X pretranslator 612 and a Z pretranslator 614, each of these pretranslators being adapted to convert two-digit binary input signals into a 1-out-of-4 output representation. The output leads emanating from the Y pretranslator 602 are designated Y0, Y1, Y2 and Y3. Those stemming from the X pretranslator 612 are marked X0, X1, X2 and X3, and those from the Z pretranslator 614 are Z0, Z1, Z2 and Z3.

FIG. 6 is intended to indicate that one input terminal of every one of a first group of 16 crosspoint units disposed in a first or front-most plane parallel to the plane of the drawing is connected to the Z3 lead of the pretranslator 614. A second plane parallel and adjacent to the first-mentioned plane contains 16 crosspoint units, one input terminal of each of which is connected to the Z2 lead. Similarly, a third plane parallel and adjacent to the second-mentioned one contains 16 crosspoint units, one input terminal of each of which is connected to the Z1 lead. Further, a fourth or back-most plane parallel and adjacent to the third-mentioned one contains 16 crosspoint units connected to the lead Z0.

Additionally, an input terminal of every one of the crosspoint units disposed in a top-most substantially horizontal plane is connected to the lead X0 of the X pretranslator 612 shown in FIG. 6. The next downward and adjacent planar group of crosspoint units is connected to the lead X1. In a similar manner the leads X2 and X3 are connected to the bottom two substantially horizontal planar groups of crosspoint units.

Furthermore, each of the leads designated Y0, Y1, Y2 and Y3 in FIG. 6 is respectively connected to an input terminal of every one of the crosspoint units included in an associated vertical planar group positioned immediately above the corresponding pretranslator output lead. For example, the output leads of the 16 crosspoint units included in the left-most vertical plane perpendicular to the plane of the drawing are each connected to the Y0 lead.

To illustrate the operation of the cubic translation array shown in FIG. 6, assume that the binary numbers 10, 10 and 11 are respectively applied to the pretranslators 602, 612 and 614 and that consequently the output leads Y2, X2 and Z3 therefrom are selected. As a result, one crosspoint unit is selected. The selected unit is located in the front plane parallel to the plane of the drawing and is located therein at the intersection of the extensions of the X2 and Y2 leads. This selected unit is redrawn in detail to the right of the cubic representation to show clearly that the Y2, X2 and Z3 leads are connected to the respective input terminals thereof.

In FIG. 6 each crosspoint unit in the cubic array is designated with a Roman numeral. The reason for this labeling will be made clear below. Additionally, the detailed arrangement of the crosspoint units in the bottom three substantially horizontal planar groups (designated 620, 625 and 630) is shown in FIGS. 6A through 6C, respectively, to the right of the cubic array shown in FIG. 6. In this way every one of the 64 crosspoint units in the array is clearly designated and easily identifiable.

In accordance with one aspect of the principles of the present invention, the output leads of 16 selected crosspoint units of the array shown in FIG. 6 are connected to one error-detecting gate 635 shown in FIG. 6D of the type described above in connection with the description of FIG. 3. Illustratively, the output leads of the remaining 48 such units are connected to the respective input terminals of a second error-detecting gate (not shown in FIG. 6). More specifically, the 16 selected units are chosen from those disposed along particular diagonals of the substantially horizontal planar groups shown in FIG. 6. Advantageously, the output leads of the crosspoint units designated I and positioned along the main diagonal of the top-most substantially horizontal planar group are connected to respective input terminals of the first-mentioned error-detecting gate. Additionally, the 12 output leads emanating from the crosspoint units designated I in the planar groups 620, 625 and 630 are also connected to respective input terminals of the first error-detecting gate. It is noted that the 16 crosspoint units whose output leads are grouped together and connected to the first gate lie in parallel diagonal planes.

In accordance with the description above, the output leads of the crosspoint units designated I in FIG. 6 are connected to one error-detecting gate and the output leads of the remaining units (designated II and III) are connected to a second error-detecting gate. Then, sequential energization of the 16 I-designated crosspoint units, under cnotrol of an exerciser unit 640, checks the other 48 units for the presence of faults therein. The I-designated units themselves can be checked for faults by sequential energization of the 16 II-designated crosspoint units.

Rather than connect the output leads of all the II- and III-designated crosspoint units to one error-detecting gate, as described above, the II-designated units may advantageously be connected to a second error-detecting gate and the III-designated units may be connected to a third such gate. This is the arrangement that is actually represented in FIG. 6, wherein the noted second and third error-detecting gates are designated 645 and 650 in FIG. 6D, respectively.

The particular arrangement of error-detecting gates shown in FIG. 6 is advantageous in that diagnosis of erroneous output signals from the cubic translation array is thereby facilitated. For example, if during actual operation of the cubic array or during sequential checking of the I- and II-designated crosspoint units, each of the three error-detecting gates 635, 645, 650 of FIG. 6D provides a ground output signal, there is indicated to the associated error unit that the cubic array has supplied three simultaneous signals on its main output leads. Additionally, if any two of the gates 635, 645, 650 provide ground signals, there is provided an indication that the cubic array is supplying two rather than only one output signals. On the other hand, if only one of the noted error-detecting gates provides a ground signal, the error unit signifies that the array is operating in its intended fashion. Thus, it is evident that there is an exact correspondence between the number of ground signals supplied by the error-detecting gates 635, 645, 650 and the number of output signals provided by the associated cubic array.

An even more significant advantage of the particular illustrative embodiment depicted in FIG. 6 is that once a double output signal condition is detected, the embodiment permits determination of which particular row of the cubic array contains the error-causing fault. For example, assume that the wire between the Y1 lead and the crosspoint unit designated 652 is broken. Sequential activation of the I-designated crosspoint units then provides a double output in response to the activation of the unit 654 which is located immediately to the right of the faulty unit 652. At that point in the testing process it is evident that the fault lies in one of the three mutually perpendicular rows each of which includes he unit 654. Now, if the embodiment of FIG. 6 included only two error-detecting gates, one responsive to the I-designated units and the other responsive to all the remaining units, it would not be possible by further systematic testing to isolate the fault to one of the three noted rows. By means of the three error-detecting gates 635, 645, 650, however, it is possible to so isolate the fault. This is accomplished by cycling through the crosspoint units which comprise the three noted rows. As a result of such cycling, double outputs are detected for at least two test commands in the row containing the fault.

Illustratively, for the specific case in which the crosspoint unit 652 is assumed to be faulty, the FIG. 6 arrangement provides a double output in response to the sequential activation of the I-designated crosspoint units and, in addition, provides a double output condition in response to the activation of the II-designated unit that is positioned immediately to the right of the unit 654. In this manner faults are located in an effective and systematic way.

Testing of the illustrative embodiment shown in FIG. 6 can be further simplified by selecting a particular set of 16 III-designated crosspoint units in a manner similar to that in which the aforementioned I- and II-designated sets were selected, specifically by choosing a set of units in parallel diagonal planes. Then sequential activation of the I-, II- and III-designated sets is sufficient to diagnose errors arising from faulty crosspoint units or pretranslators.

It is noted that our copending application Ser. No. 387,644 filed concurrently herewith is directed to related subject matter.

Furthermore, it is to be understood that the above-described arrangements are only illustrative of the application of the principles of the present invention. Numerous other arrangements may be devised by those skilled in the art without departing from the spirit and scope of the invention. For example, although the present invention has been illustratively described as applied to TRL circuitry, it is to be emphasized that the principles of this invention are applicable to logic technologies other than TRL.

Additionally, although emphasis herein has been directed for illustrative purposes to detecting the occurrence of several specific types of faults in translating equipment, it is to be understood that the principles of this invention are applicable to the detection of still other types. For example, a crosspoint unit in the translating equipment may fail in a manner such that its output lead remains always at a positive potential. The error-detecting circuitry described herein is well suited to detect such faults, as well as other types not specifically described.

What is claimed is:

1. In combination in an error-detecting circuit adapted to be associated with a multiaxis matrix array of crosspoint units each of which includes an output signal lead, a first error-detecting gate unit, means connecting said gate unit to the output leads of as elected set of crosspoint units representative of every row and column that is parallel to an axis of said array, a second error-detecting gate unit, and means connecting said second unit to the respective output leads of all of said crosspoint units except those of said seleced set.

2. In combination in a circuit for detecting the energization of more than one of a plurality of energizable lines that emanate from a plurality of crosspoint units arranged in a multiaxis matrix array, two gate units each including input terminals, and means respectively connecting said lines to said input terminals in a pattern to activate both of said gate units in response to the energization of more than one crosspoint unit that is disposed along a line parallel to any axis of said array.

3. A combination as in claim 2 wherein said array is a square matrix having a set of crosspoint units disposed along a main diagonal thereof and wherein said connecting means connects the output lines emanating from said diagonally-disposed crosspoint units to the input terminals of one of said gate units and the output lines emanating from all other crosspoint units to the input terminals of the other one of said gate units.

4. A combination as in claim 3 further including an exerciser unit connected to said array for sequentially energizing said diagonally-disposed crosspoint units, thereby to test all other crosspoint units in said array for the presence of faults therein.

5. A combination as in claim 2 wherein said array is a rectangular matrix comprising a set of crosspoint units representative of every distinct row and column thereof, and wherein said connecting means connects the output lines emanating from said set of crosspoint units to one of said gate units and the output lines emanating from all other crosspoint units to the other one of said gate units.

6. A combination as in claim 5 further including an exerciser unit connected to said array for sequentially energizing the crosspoint units included in said set, thereby to test all other crosspoint units in said array for the presence of faults therein.

7. In combination in a circuit for detecting the energization of more than one of a plurality of energizable lines that emanate from a plurality of crosspoint units arranged in a multiaxis matrix array, a single gate having a plurality of input terminals, means respectively connecting said lines to said input terminals, an exerciser unit connected to said array for applying first signals thereto to sequentially energize a first selected set of said crosspoint units, and means connecting said exerciser unit to said first selected set of crosspoint units for applying inhibiting signals thereto in coincidence with the application of said first energizing signals to said array.

8. A combination as in claim 7 further including a second distinct selected set of crosspoint units, and wherein said exerciser unit is adapted to apply second signals to said array to sequentially energize said crosspoint units included in said second set, and means connecting said exerciser unit to said second selected set of crosspoint units for applying inhibiting signals thereto in coincidence with the application of said second energizing signals to said array.

9. In combination in an error-detecting circuit which is adapted to be connected to a matrix array defined by an intersecting pattern of row and column conductors, each pair of intersecting conductors defining a crosspoint of said matrix, said matrix including a plurality of crosspoints disposed along a main diagonal of said array, a plurality of output gates each having an output terminal and two input terminals respectively connected to a pair of conductors defining a different crosspoint of said matrix, a first error-detecting gate having an output terminal and a plurality of input terminals respectively connected to the output terminals of the output gates which are disposed along said main diagonal, a second error-detecting gate having an output terminal and a plurality of input terminals respectively connected to the output terminals of all output gates of said matrix except those disposed along said main diagonal, and means connected to the output terminals of said first and second error-detecting gates for detecting faults in said arrays.

10. In combination in an error-detecting circuit adapted to be associated with an $n \times n \times n$ cubic matrix array of crosspoint units for detecting the occurrence of multiple output signals from said units, where $n$ equals $2^m$ and $m$ is any positive integer greater than 1, an error-detecting gate unit connected to a selected set of $n^2$ crosspoint units of said array, said set of units being disposed in a pair of parallel diagonal planes, and error-detecting means connected to the remaining ones of said crosspoint units.

11. A combination as in claim 10 wherein said error-detecting means comprises a single error-detecting gate unit.

12. A combination as in claim 10 wherein said error-detecting means comprises two distinct error-detecting gate units, means connecting one of said distinct units to another selected set of $n^2$ crosspoint units disposed in another pair of parallel diagonal planes of said array, and means connecting the remaining ones of said crosspoint units to said other distinct gate unit.

(References on following page)

References Cited

UNITED STATES PATENTS

| | | | |
|---|---|---|---|
| 2,904,781 | 9/1959 | Katz | 340—174 |
| 2,958,072 | 10/1960 | Batley | 340—147 |
| 2,999,637 | 9/1961 | Curry | 235—175 |
| 3,049,692 | 8/1962 | Hunt | 340—146.1 |

OTHER REFERENCES

O'Connor, L. T., Ring Checking, IBM Technical Disclosure Bulletin, vol. 4, No. 9, February 1962.

MALCOLM A. MORRISON, *Primary Examiner.*

C. E. ATKINSON, *Assistant Examiner.*